Figure 1:
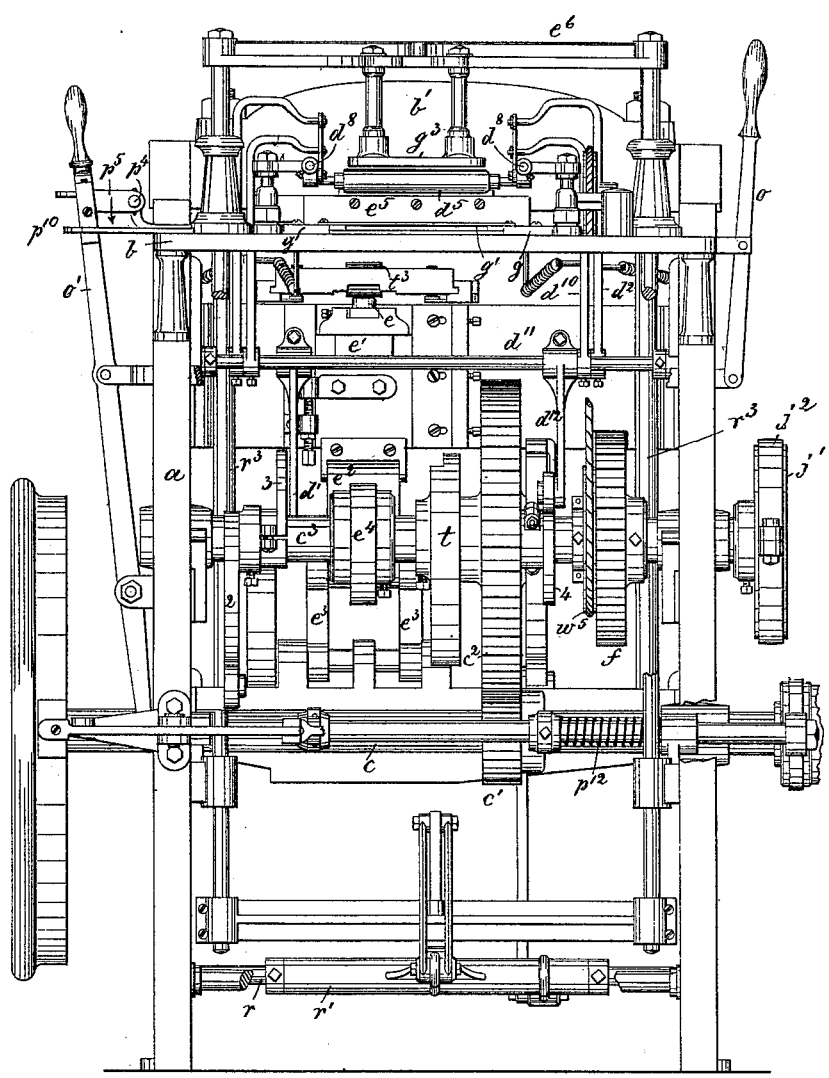

(No Model.)  6 Sheets—Sheet 1.

H. J. WICKHAM.
Newspaper Wrapper Machine.

No. 233,450.  Patented Oct. 19, 1880.

Witnesses.
Arthur Reynolds.
W. E. C. Whitney.

Inventor
Horace J. Wickham
by Crosby & Gregory Attys.

N. PETERS, PHOTO-LITHOGRAPHER, WASHINGTON, D.C.

(No Model.) 6 Sheets—Sheet 2.

H. J. WICKHAM.
Newspaper Wrapper Machine.

No. 233,450. Patented Oct. 19, 1880.

Witnesses.
Arthur Reynolds
N. E. C. Whitney

Inventor.
Horace J. Wickham
by Crosby Gregory
Att'ys.

(No Model.) 6 Sheets—Sheet 3.
H. J. WICKHAM.
Newspaper Wrapper Machine.
No. 233,450. Patented Oct. 19, 1880.
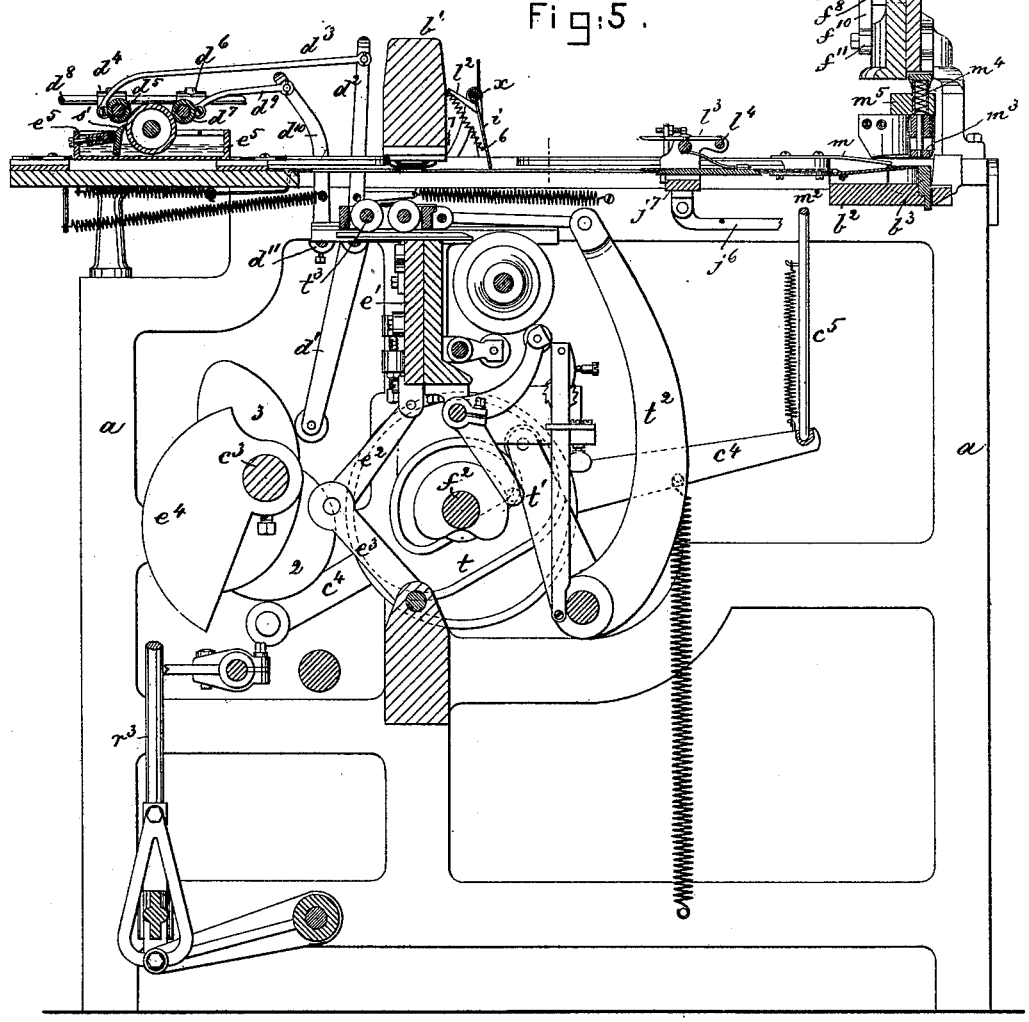
Witnesses
Arthur Reynolds
N. E. C. Whitney
Inventor
Horace J. Wickham
by Crosby & Gregory
Attys.

(No Model.)  6 Sheets—Sheet 4.

H. J. WICKHAM.
Newspaper Wrapper Machine.

No. 233,450. Patented Oct. 19, 1880.

Witnesses.
Arthur Reynolds
N. E. C. Whitney

Inventor.
Horace J. Wickham
by Crosby Gregory
Attys

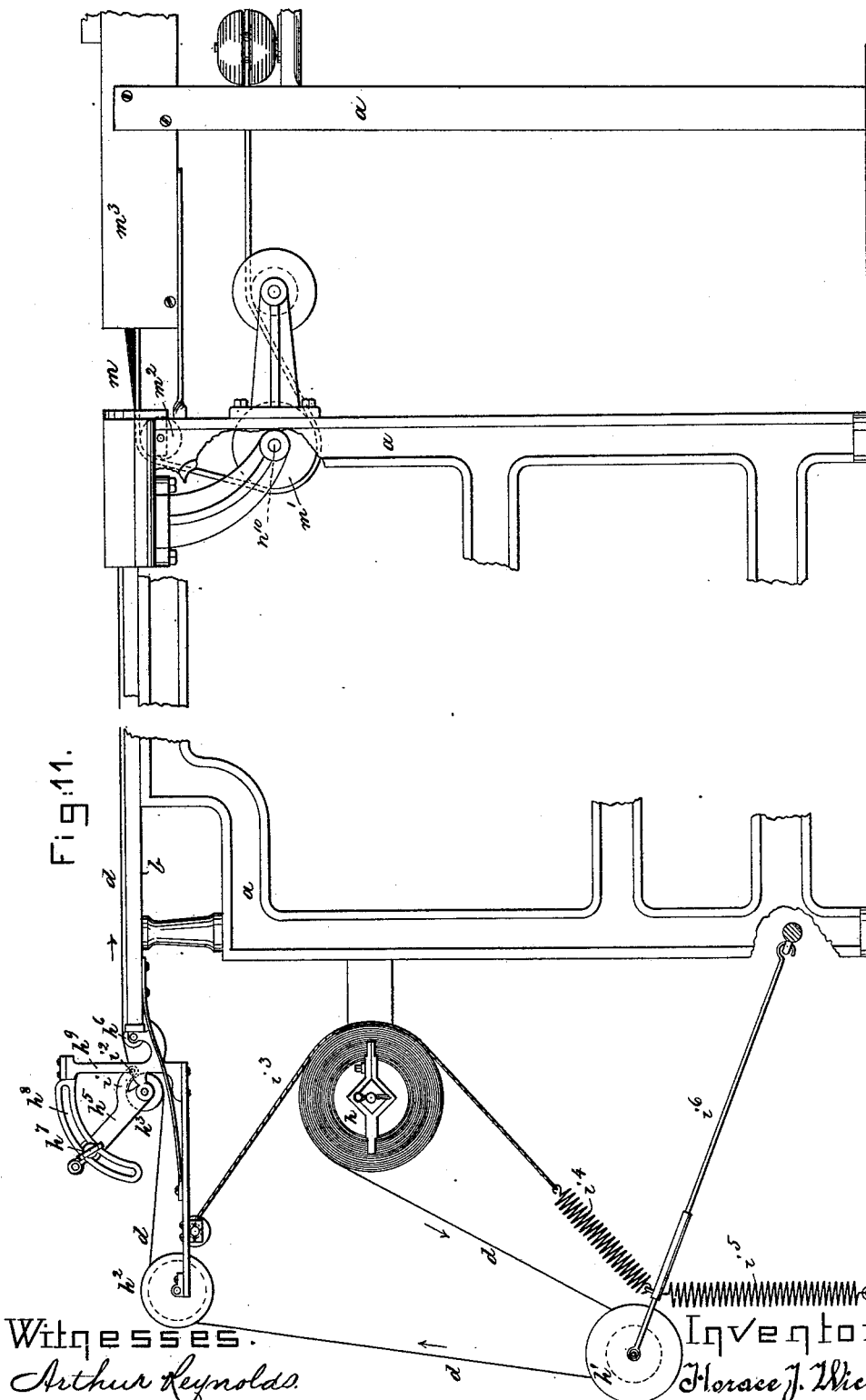

(No Model.) 6 Sheets—Sheet 6.
H. J. WICKHAM.
Newspaper Wrapper Machine.
No. 233,450. Patented Oct. 19, 1880.
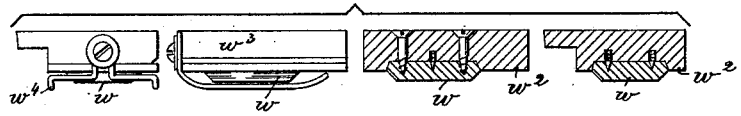
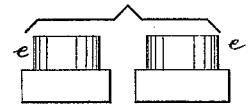
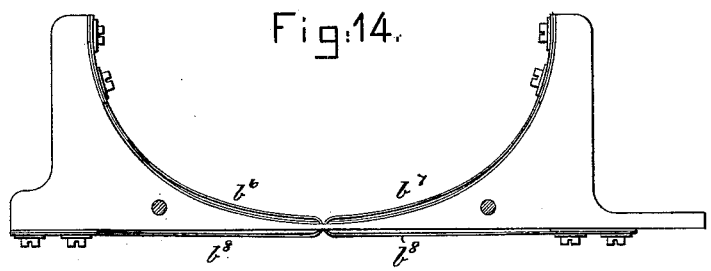
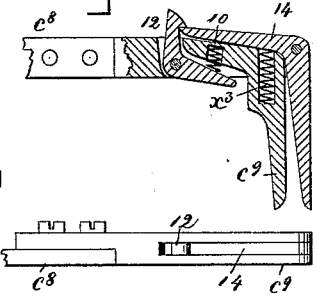
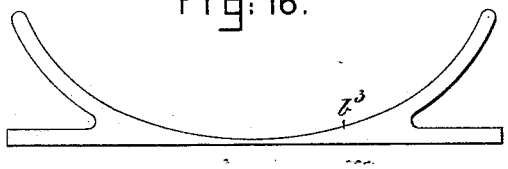
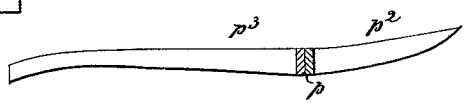
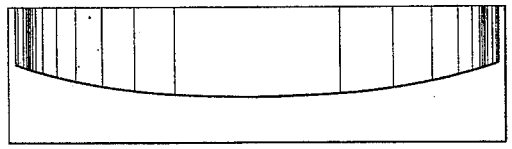
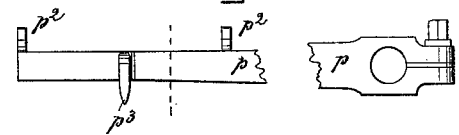
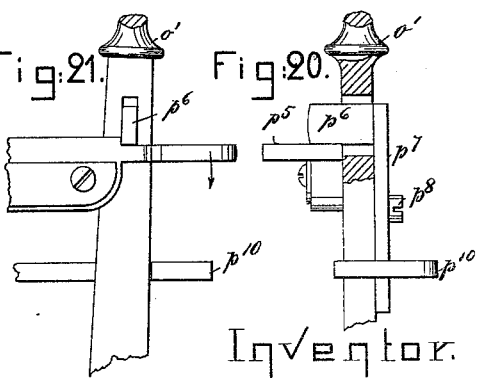
Witnesses.
Arthur Reynolds.
N. E. C. Whitney.
Inventor.
Horace J. Wickham
by Crosby Gregory Attys

UNITED STATES PATENT OFFICE.

HORACE J. WICKHAM, OF HARTFORD, CONNECTICUT.

NEWSPAPER-WRAPPER MACHINE.

SPECIFICATION forming part of Letters Patent No. 233,450, dated October 19, 1880.

Application filed June 5, 1880. (No model.)

*To all whom it may concern:*

Be it known that I, HORACE J. WICKHAM, of Hartford, county of Hartford, State of Connecticut, have invented an Improvement in Machines for the Manufacture of Newspaper-Wrappers, of which the following description, in connection with the accompanying drawings, is a specification.

This invention relates to mechanism for forming newspaper-wrappers. In this my invention the material from which the newspaper-wrappers are to be cut is wound upon a reel in the form of a web or strip of the width desired for the wrapper. This web or strip is automatically carried forward under certain reciprocating gummers, that descend upon and apply gum transversely to the said web or strip, preferably in a curved line. This web or strip is then carried forward beneath a suitable cutter, which descends and severs the said web or strip transversely. This cutting mechanism does not make simply a straight cut, but is so shaped that it cuts from the web such a shaped piece of paper as leaves, in this instance, the ungummed end of the wrapper straight and the gummed end curved. The gum applied transversely or distributed upon this web or strip has a chance to dry, in a measure, before the said gummed portion arrives in position for the web or strip to be severed near it. The said gummed blanks so severed from the web or strip are, in practice, discharged upon an endless belt of considerable length, upon which the wrappers are thoroughly dried, and from which they are gathered and bunched. The waste material of the strip or web, formed by severing it, as before described, is automatically engaged by a pair of nippers or equivalent device and withdrawn from the machine. The waste paper of this machine is very small, and the machine is rapid and efficient in its operation, and by it the Government stamp is applied while the paper is in its web or strip form.
The particular features and mechanisms in which my invention consists are more definitely and specifically set forth at the end of the description of this machine.

Figure 3:
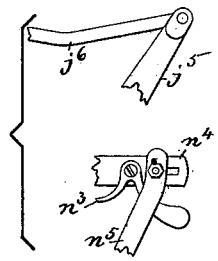
Figure 4:
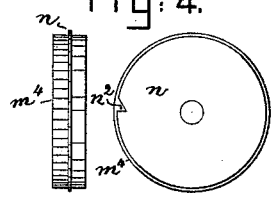
Figure 2:
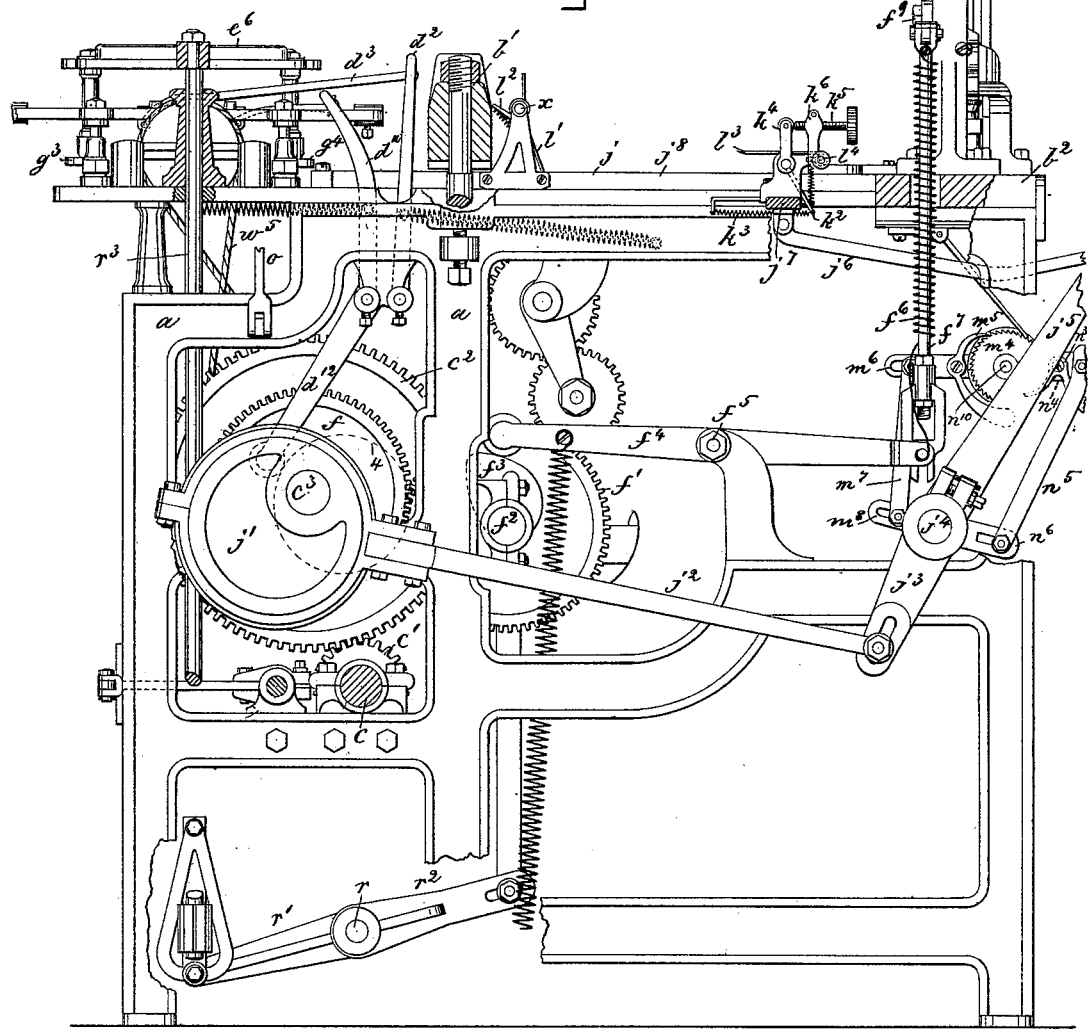
Figure 9:
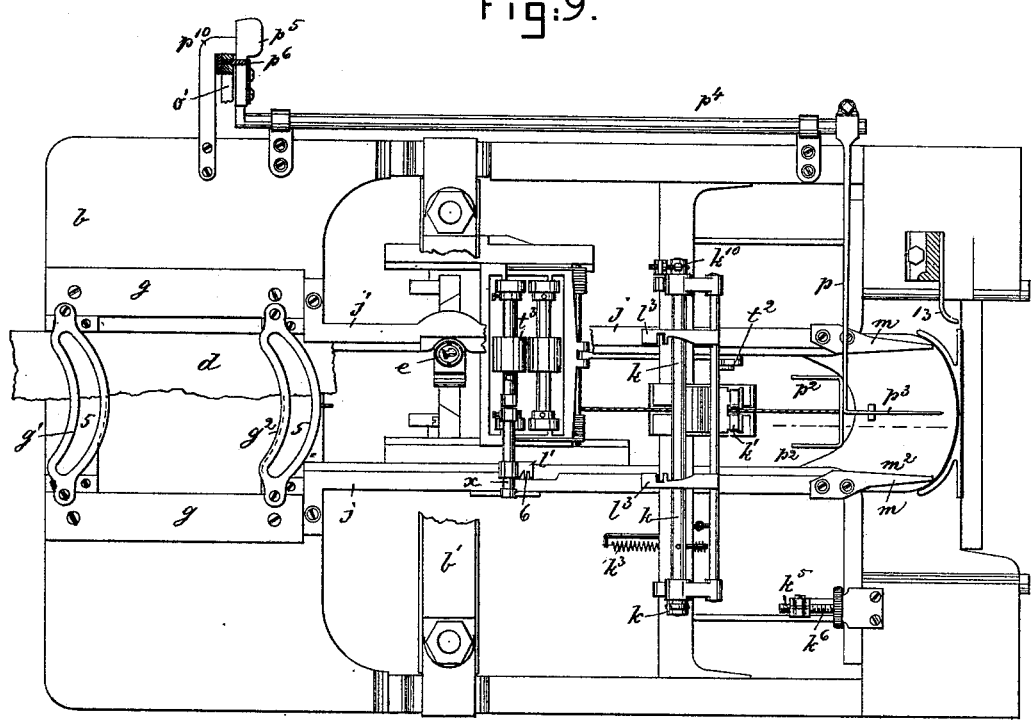
Figure 10:
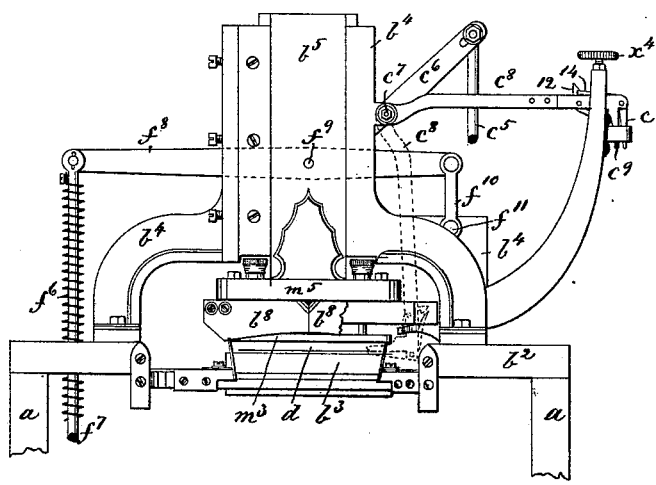

Figure 1 is a front-end elevation of the machine with the paper-supplying and tension mechanism removed, the driving-pulley at the right hand being omitted. Fig. 2 is a right-hand side elevation of Fig. 1, the cross-heads and part of the frame-work being in section. Fig. 3 represents details of the ratchet mechanism and other parts broken away from the right of Fig. 2. Fig. 4 represents, in two views, the ratchet-wheel for operating the endless belt upon which the finished newspaper-wrappers are delivered. Fig. 5 is a longitudinal section taken through the center of Fig. 1. Fig. 6 is a detail of the gum-box. Fig. 7 is a detail of the mechanism for clamping and pulling along the web of paper. Fig. 8 is a cross-section of the gage-bars for the edges of the web of paper; Fig. 9, a top view of the machine, the gum-box being removed and the cross-head and the cutting-plunger being broken out; Fig. 10, a rear elevation of the upper part of the machine, showing the cutter for severing the web or strip of paper into newspaper-wrappers; Fig. 11, a side elevation of the frame of the machine shortened by breaking it away centrally, the frame having connected with it the roll of paper, the tension mechanism for keeping the paper taut, and the wrapper-receiving belt; Fig. 12, details of the pad for the stamp-dies and their holding-blocks; Fig. 13, details of the stamp-dies; Fig. 14, a plan of the cutters for severing the paper strips; Fig. 15, a detail of the nipper for pulling away the waste; Fig. 16, a top view of the under members of the cutter or cutter-bed; Figs. 17, 18, 19, 20, and 21, details to be referred to; and Fig. 22 represents the waste-piece removed from between the ends of adjacent wrappers.

The frame $a$, of proper shape to sustain the working parts, has a top plate, $b$, a rigid cross-head, $b'$, a beam, $b^2$, to support the lower member, $b^3$, of the wrapper-cutter, a yoke, $b^4$, to receive within it and guide the slide-bar $b^5$, to the lower end of which are attached the curved blades $b^6$ $b^7$, to shape the gummed end of the wrapper, and the straight cutters or blades $b^8$, to form the ungummed or square ends of the said wrappers.

The main shaft $c$ of the machine, driven in any usual way by power, has a pinion, $c'$, which engages a toothed gear, $c^2$, on the primary camshaft $c^3$. This shaft has a cam, 2, which strikes a rod on a lever, $c^4$, connected by a rod, $c^5$, with an arm, $c^6$, of the rock-shaft $c^7$, (see Fig. 5,) which at its other end has attached to it the arm $c^8$, provided with the nipper $c^9$, (see Fig. 15,) which at the proper times, as will be hereinafter described, engage and draw from the machine the pieces of waste paper made by cutting the web of paper $d$ into newspaper-wrappers.

The cam 3 on the shaft $c^3$ strikes a roll on the arm $d'$ of a rock-shaft, having arms $d^2$, connected by links $d^3$ with the sliding boxes $d^4$, which carry the gumming-roller $d^5$, the said boxes, as well as the boxes $d^6$ for the gumming-roller $d^7$, sliding on guide-bars $d^8$. The boxes $d^6$ are connected by links $d^9$ with arms $d^{10}$ of a rock-shaft, $d^{11}$, provided with an arm, $d^{12}$, actuated by the cam 4.

The Government stamping-die $e$, secured to a slide, $e'$, having a toggle-jointed link, $e^2$ $e^3$, is operated by a cam, $c^4$, as in the United States Patent No. 177,048, granted to me May 2, 1876.

In this present machine the cross-head $b'$, the stamp-inking devices, the gum-box $e^5$, and the cross-heads $e^6$, to which are attached the gummers $g^3$ $g^4$ and the mechanism for reciprocating the said cross-heads, are also all as in the said patent. The pinion $f$ on the shaft $c^3$ engages the pinion $f'$ on and rotates the shaft $f^2$, which, as in the patented machine referred to, carries the cam that operates the inking devices. This shaft $f^2$ is also provided with a cam, $f^3$, that operates the lever $f^4$, pivoted at $f^5$, which is attached at its other end in a yielding manner, by means of a spring, $f^6$, and a rod, $f^7$, with a lever, $f^8$, connected at $f^9$ (see Fig. 10) with the slide $b^5$, which carries the cutting-blades, the said lever $f^8$ having its fulcrum upon a link, $f^{10}$, pivoted at $f^{11}$ on the rigid part $b^4$ of the frame.

Upon the platform $b$, beneath the gum-box, are placed two guides, $g$, and extending across between these guides are two stripper-plates, $g'$ $g^2$, provided with curved openings 5, shaped substantially in accordance with the shape of the gummers $g^3$ $g^4$, which are made to descend through the openings of the said stripper upon and so as to apply gum to the web of paper at the desired intervals apart, according to the length of the newspaper-wrappers to be formed, the said gummers each operating successively upon the web at the same place, thereby insuring a thorough gumming action. The web, or it might be termed a "strip of paper," the width of the wrapper to be made, which is to be gummed, stamped, and then severed into newspaper-wrappers, with one end curved, passes from a reel, $h$, under a tension-spool, $h'$, thence over a leading-roll, $h^2$, under a straightening-roll, $h^3$, supported in an adjustable frame, $h^5$, which is held in a more or less elevated position with relation to the surface of the rollers $h^2$ $h^6$ by means of a thumb-screw, $h^7$, and a slotted bar, $h^8$, projected forward from the top of the frame $h^9$.

The ears $i$ of the frame $h^5$ at the rear of the straightening-roller $h^3$ have a small roller, $i^2$, which bears upon the under surface of the web of paper, the said rollers $h^3$ $i^2$ removing from the said web all wrinkles or curves which may be in it by reason of its having been wound closely upon the roller $h$.

The strap or cord $i^3$ and springs $i^4$ $i^5$, connected with the arm $i^6$, which carries the spool $h'$, prevents the web from unwinding too rapidly, and also takes up the slack in the web or strip of paper extended backward from the gum-box and under the cross-head $b'$. At each side of the machine are edge-gages $j$ $j$, which receive and guide the edges of the web or strip $d$ of paper, one of said edge-gages being shown in section, Fig. 8.

The eccentric $j'$ (see Fig. 2) at the end of shaft $c^3$ is connected by a link, $j^2$, with an arm, $j^3$, on a rock-shaft, $j^4$, having an arm, $j^5$, which, by a link, $j^6$, is attached to a carriage, $j^7$, having its end fitted to ride in guideway $j^8$ in the side frame of the machine, as slides the crosshead of a piston in a steam-engine. The connected ends of the arm $j^5$ are broken off in Fig. 2, the size of the sheet of drawings not permitting them to remain, but are shown at the upper part of Fig. 3. This carriage $j^7$ has a rock-shaft, $k$, (see Fig. 9,) provided at its center with a clamp, $k'$, preferably rubber clothed, which, at the proper time, is thrown down upon the web or strip of paper between the gummed portions of its surface, and is there held while the carriage is moved forward, the clamp acting to pull the web or strip intermittingly through the machine and from the reel.

The shaft $k$ has an arm, $k^2$, connected with a strong spring, $k^3$, which holds the clamp $k'$ down upon the paper when the said shaft is not operated upon positively to lift the said clamp. At the right hand of the said shaft $k$ is an arm, $k^4$, which, as the said carriage is moved forward, is struck by the end of a screw, $k^5$, in the stationary bracket $k^6$, the said screw turning the shaft $k$, lifting the clamp $k'$ from the paper, and causing a finger, $k^7$, on the said shaft (see Fig. 7) to be caught by the notched part $k^8$ of an elbow-lever, $k^9$, pivoted on the said carriage, and provided with an adjusting-screw, $k^{10}$, which, as the carriage arrives near the cross-head $b'$, meets the stop $l$, turns the lever $k^9$, releases the finger $k^7$, and permits the spring $k^3$ to operate the shaft and throw the clamp $k'$ down. Immediately in front of the cross-head $b'$ are dogs $l'$ on a rod, $x$, having their lower ends held in contact with the web or strip of paper by a spring, $l^2$, except as the gummed part of the paper arrives near said dogs, when they are lifted by means of fingers $l^3$ on a shaft, $l^4$, of the carriage $j^7$. During the forward motion of the carriage the fingers $l^3$ ride over the projections 6 of the dogs; but as the carriage moves backward the notched portions of the said fingers engage the projections 6 and temporarily lift the dogs from contact with the paper. At the forward ends of the side-guides $j$ are fingers $m$, which prevent the paper from rising, and below the paper is a yielding sheet-metal bed, $m^2$, which supports the web or strip of paper quite up to the stationary member $b^3$ of the cutting mechanism. The paper to be cut is clamped upon this stationary member $b^3$ by a clamp, $m^3$, having a rod acted upon by a spring, $m^4$, and carried in a socket-piece of the slide $b^5$. At each side of a cross-bar, $m^5$, of the slide, and in line with this clamp, are attached the cutters $b^6$ $b^7$ $b^8$, shaped as shown. (See Fig. 14.)

The stationary or lower member of the cutter is made narrow, and as shown in top view (see Fig. 16) and side view, (see Fig. 17,) and the cutters descend each side of it. This lower member constitutes a cutting-bed, $b^3$.

The pieces of paper cut out by the said cutters and left as waste are represented in Fig. 22 by the letter $x^2$. The nippers $c^9$, before referred to, catch and remove these waste pieces $x^2$ thus formed. As the nippers descend they are held open, as in Fig. 15, by means of the catch 12, and as the nippers pass over the end of the waste pieces $x^2$, catch 12 strikes the finger 13, (see Fig. 9,) which moves the catch, and permits the spring $x^3$ to act on the arm 14 of one of the nipper-legs, and closes the nippers upon strip $x^2$. Now the nipper is made to rise, drawing the waste pieces $x^2$ from the cutters, and as soon as the nipper reaches its highest position the portion 14 of the nipper strikes the point of the screw or stop $x^4$, opens the nipper, and causes the arm 14 to be again caught by the catch 12, which holds the nipper open until again closed, as before described.

The endless belt upon which the newspaper-wrappers are delivered when formed by the cutting-out devices, as hereinbefore described, is indicated at $m$. (See Fig. 11.) It is extended about rollers $m'$ $m^2$, connected with a proper frame-work near the right-hand end of the machine, or that end of it shown in Fig. 2. The opposite end of this belt, which may be twenty or fifty feet long, will be passed over suitable rollers to keep it taut, and the said belt will pass preferably through a sort of box having sides $m^3$, to prevent lateral displacement of the wrappers, all in usual manner. This belt $m$ derives its intermitting step-by-step movement from a ratchet, $m^4$, having twenty-six teeth, which will be placed on the shaft carrying the roller $m'$. This ratchet is engaged by a pawl, $m^5$, on a pawl-carrying lever, $m^6$, connected by a link, $m^7$, with an arm, $m^8$, projecting from the rocking shaft $j^4$, the said connections being adjustable in order to enable the pawl $m^5$ to move the ratchet the proper distance, according to the uniform distance that it is desired that one wrapper shall fall short of the sealed flap or gummed end of the wrapper previously made and deposited on the belt $m$. It is desired that as each twenty-fifth wrapper is deposited on the said belt the latter should have given to it a movement in excess of the twenty-four movements previously given to it, to thus make a greater space between the row of wrappers to indicate where the same may be gathered up to form bunches of twenty-five wrappers. This is done in the following manner: At the rear of the ratchet $m^4$, and fast on the same shaft $n^{10}$, is a ratchet, $n$, having but one tooth, $n^2$. A pawl, $n^3$, on an arm, $n^4$, is reciprocated by link $n^5$, connected with an arm, $n^6$, of the rock-shaft $j^4$, over a distance twice as great as the pawl $m^5$, but the pawl $n^3$ operating on the smooth periphery of the one-toothed ratchet, except just after the twenty-fifth wrapper is laid, when the pawl $n^3$ engages the tooth $n^2$ and turns it and the shaft on which the said ratchet $m^4$ $n$ are fixed, turning the same for a distance equal to twice the distance the said shaft $n^{10}$ would have been turned by the pawl $m^5$, such extra distance of movement placing the first wrapper of each bunch of twenty-five wrappers at a greater distance from the twenty-fifth wrapper than that between any two wrappers from the first to the twenty-fifth.

The cam $t$ and arms $t'$ $t^2$ operate the rollers $t^3$, that supply the ink to the stamp $e$, the said rollers and their sliding carriage being all as common.

Fig. 12 shows the leather or other removable bed or impression pad or surface, which is secured to the cross-beam $b'$ to oppose the upward thrust of the die $e$. This pad is secured to a plate, $w^2$, fitted into a guideway, $w^3$, at the lower side of the said cross-head, and held against longitudinal movement by a suitable spring or locking device, $w^4$. Belt $w^5$ drives the roller $s$ in the gum-box.

I have provided the machine with shipping mechanism to automatically stop it should the web or strip become bunched up in front of the cutting-out blades or devices. This mechanism is shown in Figs. 1, 9, 18, 19, 20, and 21, Fig. 18 being a section of Fig. 19 on the dotted line, Fig. 19.

At the side of the frame I have placed a rocker-shaft, $p^4$, with which is connected an arm, $p$, having fingers $p^2$ $p^3$, which bear upon or rest close to the top of the strip or web as it is moved through the machine. At the front of this rock-shaft is a notched finger, $p^5$, (most clearly shown in Fig. 21,) that engages a lug, $p^6$, on a plate, $p^7$, connected by a screw, $p^8$, with the regular shipper-lever $o'$, which has its upper end held outward between the outward stop, $p^{10}$, and a shoulder of the finger $p^5$, as in Figs. 1, 9, and 21.

If the paper becomes bunched or clogged under the fingers $p^2$ or $p^3$, the rocker-shaft $p$ is partially rotated to turn the finger $p^5$ in the direction of the arrow near it, withdrawing the said finger from the lug $p^6$, releasing the shipper-handle $o'$, and permitting the spring $p^{12}$, held compressed when the shipper is locked outward, to act and throw the shipper-lever in at its upper end, causing it, through its connections of usual construction, to disengage the usual friction-pulleys and stop the machine.

The hand-lever $o$ at the right-hand side of the machine is to enable the operator, on the discovery of an error in the machine, to instantly stop it without being obliged to go to the opposite side of it.

I claim—

1. In a newspaper-wrapper machine, a reel or shaft to support a strip or roll of paper of the width of the newspaper-wrapper to be formed, the gummer to apply gum across the said strip, feeding mechanism to move the said strip of paper forward, and the cutting mechanism to sever the said strip transversely near the line of gum applied to it, to shape the gummed end of one and the ungummed end of an adjacent wrapper, substantially as described.

2. In a newspaper-wrapper machine, a gummer to apply gum upon and across the strip of paper at intervals, as set forth, as the strip is fed through the machine, means, substantially as described, to print or stamp on the said strip between the said gummed portions a device such as the well-known so-called "Government stamp," and cutters to subsequently sever the said gummed and printed and stamped or embossed strip near the gummed portions, the said cutters being shaped to remove a portion of the strip and shape the rear end of one and the sealing and gummed end of an adjacent wrapper, substantially as described.

3. In a newspaper-wrapper machine, the gum-box and rollers and the two gummers, to which the said rollers supply the desired amount of gum, combined with the plates $g'$ $g^2$, separated from each other for a distance substantially equal to the length of the wrapper to be made, to thereby enable each gummer to descend upon the said strip at the same place to effectually and gradually gum it transversely, as set forth.

4. In a newspaper-wrapper machine, the gummer to gum the strip transversely, combined with the sliding carriage and its clamp, and means, substantially as described, to operate the clamp to enable it to engage the gummed strip at points between the transverse lines of gum, to move the strip forward intermittingly, and to release or lift the clamp from the said strip when the carriage is moved backward to thus pass over the gummed parts, substantially as described.

5. The gumming mechanism to gum the strip and feeding mechanism to move the strip forward, combined with the dogs to bear upon and prevent retrograde or backward movement of the gummed strip, and movable fingers $l^3$, to lift the said dogs as the gummed part of the strip passes under them, substantially as described.

6. In a newspaper-wrapper machine, the gumming mechanism to apply gum to the strip at intervals transversely, and mechanism to feed the gummed strip forward of the cutting-blades $b^6$ $b^7$ $b^8$ and cutting-bed $b^3$, to cut the said gummed strip transversely and shape the gummed end of one wrapper and the ungummed end of an adjacent wrapper, as described.

7. In a newspaper-wrapper machine, the cutters $b^6$ $b^7$ $b^8$ and bed $b^3$, to cut from the strip transversely at intervals an irregular waste piece of paper, combined with nippers to automatically seize and remove the said waste pieces from the cutter-bed, substantially as and for the purpose described.

8. In a newspaper-wrapper machine, the shipper-handle $o'$ and lever or arm $p$ and its fingers, to rest above the moving web or strip, and adapted to be lifted when the web or strip becomes bunched up under the fingers, combined with the rock-shaft $p^4$ and means, substantially as described, to hold and retain the said shipper-lever, as and for the purpose set forth.

In testimony whereof I have signed my name to this specification in the presence of two subscribing witnesses.

HORACE J. WICKHAM.

Witnesses:
M. S. CHAPMAN,
HIRAM R. MILLS.